United States Patent [19]

Sano et al.

[11] 4,373,153
[45] Feb. 8, 1983

[54] STOP INDICATOR ARRANGEMENT FOR AN AUTOMOTIVE VEHICLE

[75] Inventors: Isao Sano, Tokyo; Hiroshi Kanamori, Yokohama, both of Japan

[73] Assignee: Nissan Motor Co., Ltd., Yokohama, Japan

[21] Appl. No.: 275,823

[22] Filed: Jun. 22, 1981

[30] Foreign Application Priority Data

Aug. 12, 1980 [JP] Japan ............................ 55-111385

[51] Int. Cl.³ ..................... B60Q 1/00; B62D 25/00
[52] U.S. Cl. ................................. 340/87; 296/195; 296/208; 362/83
[58] Field of Search .................... 340/71, 97, 87; 296/195–197, 208, 209; 362/74, 83

[56] References Cited

U.S. PATENT DOCUMENTS

| | | |
|---|---|---|
| 2,760,113 | 8/1956 | Danek . |
| 3,455,595 | 7/1969 | Wessells et al. ............ 296/208 |
| 3,497,871 | 2/1970 | Damico ...................... 340/71 |
| 3,501,742 | 3/1970 | Ellison ....................... 340/71 |
| 3,728,537 | 4/1973 | Barenyi et al. ............. 362/74 |
| 3,761,706 | 9/1973 | Frey . |
| 4,251,103 | 2/1981 | Nakajima et al. .......... 296/195 |
| 4,268,892 | 5/1981 | Pfeiffer et al. ............. 362/83 |

FOREIGN PATENT DOCUMENTS 1906866 9/1970 Fed. Rep. of Germany .

Primary Examiner—Donald J. Yusko
Attorney, Agent, or Firm—Thompson, Birch, Gauthier & Samuels

[57] ABSTRACT

A stop indicator arrangement for an automotive vehicle furnished with a rear window and a brake system, has a pair of main stop indicator units and a auxiliary stop indicator unit all of which emit light when energized. The main units are positioned at the opposite ends of the lower portion of the vehicle's rear under the rear window in such a manner as to face backward. The auxiliary unit is positioned just below the rear window but above the main units in such a manner as to face backward. An electric power source is connected to the main and auxiliary units through a brake switch, which is operated when the brake system is applied. All of the main and auxiliary units are energized to emit light backward when the brake system is applied.

10 Claims, 9 Drawing Figures

STOP INDICATOR ARRANGEMENT FOR AN AUTOMOTIVE VEHICLE

BACKGROUND OF THE INVENTION

1. Field of the Invention

This invention relates to a stop indicator arrangement for an automotive vehicle, more specifically to an arrangement for indicating the application of the brake of an automotive vehicle to drivers of following vehicles.

2. Description of the Prior Art

A stop lamp arrangement for an automobile has been proposed heretofore wherein backward facing auxiliary stop lamps are placed on the rear parcel shelf in front of a rear window to make the positions thereof higher in order to improve the visibility of the stop lamps for drivers of following automobiles. Since these auxiliary stop lamps are positioned on the rear parcel shelf in front of the rear window, they reduce the space on the rear parcel shelf where objects could be put, and moreover maybe reduce the rearward visibility for the driver of the automobile.

SUMMARY OF THE INVENTION

It is an object of the present invention to provide a stop indicator arrangement for an automotive vehicle which enables the space on the rear parcel shelf or the space inside the vehicle to be utilized effectively.

It is another object of the present invention to provide a stop indicator arrangement for an automotive vehicle which does not reduce the rearward visibility of the driver of the vehicle.

The stop indicator arrangement of the present invention for an automotive vehicle furnished with a rear window and a brake system, has a pair of main stop indicator units and an auxiliary stop indicator unit all of which emit light when energized. The main units are positioned at the opposite ends of the lower part of the vehicle's rear under the rear window in such a manner as to face backward. The auxiliary unit is positioned just below the rear window but above the main units in such a manner as to face backward. An electric power source is connected to the main and auxiliary units through a brake switch, which is operated when the brake system is applied. All of the main and auxiliary units are energized to emit light backward when the brake system is applied.

The above and other objects, features and advantages of the present invention will be apparent from the following description of preferred embodiments thereof, taken in conjunction with the drawings.

DESCRIPTION OF THE PREFERRED EMBODIMENTS

Figure 1:
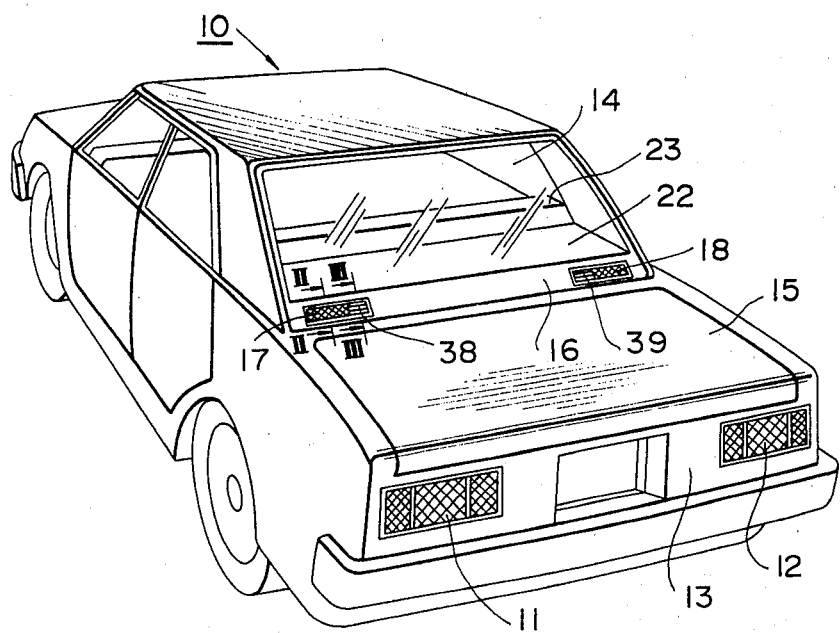
FIG. 1 is a diagrammatical perspective view of an automobile equipped with a stop indicator arrangement according to a first embodiment of the present invention.

Reference is now made to FIG. 1, illustrating a first embodiment of the present invention, wherein an automobile 10 has a pair of indicator units 11 and 12 placed at the opposite ends of an automobile rear panel 13 or the opposite sides of the same with respect to the automobile 10. The indicator units 11 and 12 face backward and each consist of stop, side and direction indicator lamps. When the brake (not shown) of the automobile 10 is applied, the stop lamps are turned on to emit red light backward in the usual way. The automobile 10 is furnished with a trapezoidal rear window 14 and a rectangular boot lid 15 able to open pivotally in the conventional way. The rear window 14 slopes downward from the front to the rear with respect to the automobile 10. The boot lid 15 in its closed state extends approximately horizontally from a position just above the rear panel 13 to a position near the lower end of the rear window 14 as shown in FIG. 1. A laterally extending elongated panel assembly 16 is provided between the lower end of the rear window 14 and the front end of the boot lid 15. The panel assembly 16 is thus positioned just below the rear window 14 and slopes at the same angle as that of the rear window 14. A pair of auxiliary stop indicator units 17 and 18 are mounted on the opposite ends of the panel assembly 16, or the opposite sides of the same with respect to the automobile 10, so as to face roughly backward. Thus the auxiliary stop indicator units 17 and 18 are in positions higher than those of the indicator units 11 and 12 but lower than that of the rear window 14. Therefore these auxiliary units 17 and 18 do not reduce the rearward visibility of the driver of the automobile 10. When the brake of the automobile 10 is applied, the auxiliary stop indicator units 17 and 18 are energized to emit red light backward along with the stop lamps of the usual indicator units 11 and 12, as described hereinafter.

Figure 2:
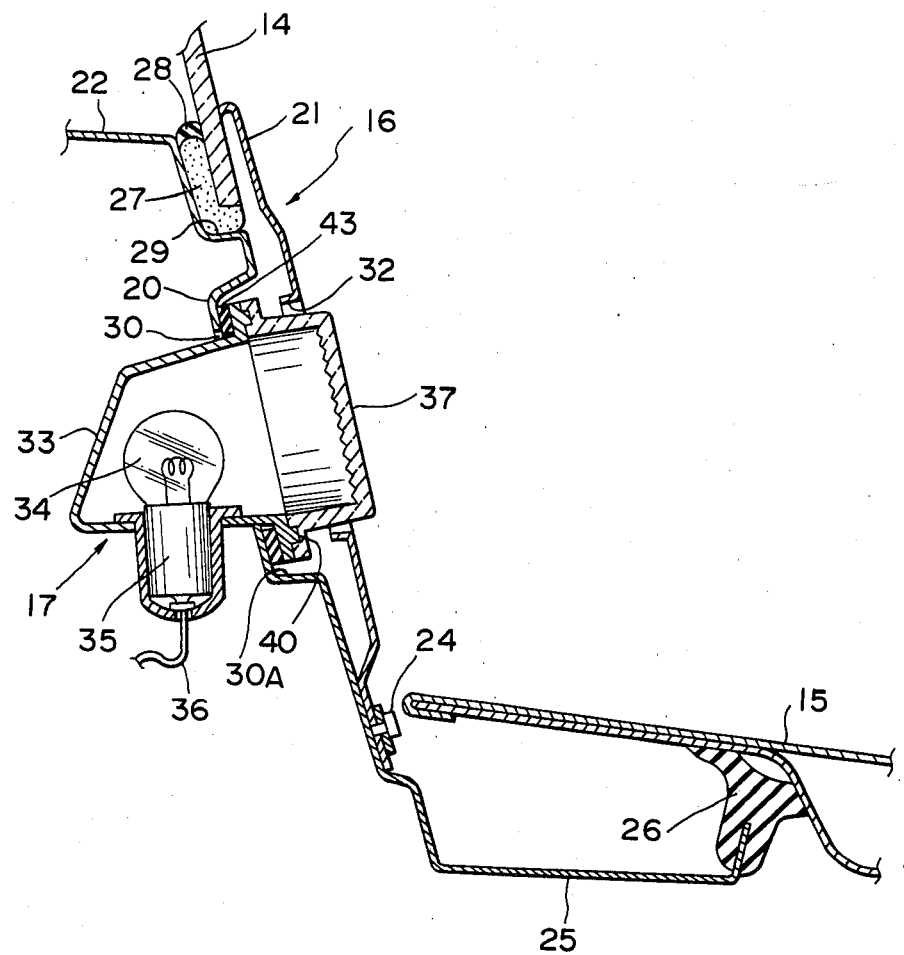
FIG. 2 is a section taken through the line II—II of FIG. 1.
Figure 3:
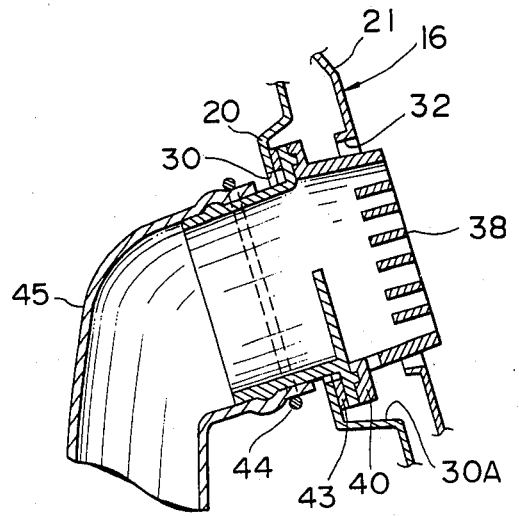
FIG. 3 is a section taken through the line III—III of FIG. 1.
Figure 4:
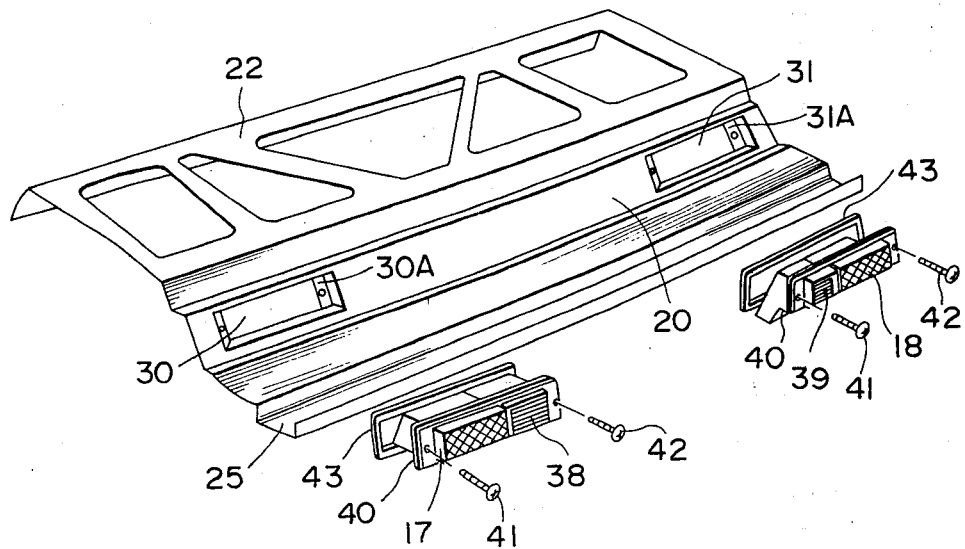
FIG. 4 is an exploded view of the stop indicator arrangement of FIG. 1.

As illustrated in FIGS. 2 to 4, the panel assembly 16 is made up of roughly parallel inner and outer panels 20 and 21 respectively. The inner panel 20 extends integrally from the rear end of a parcel shelf panel 22 towards the boot lid 15 in such a manner as to slope downward from the front to the rear with respect to the automobile 10. The parcel shelf panel 22 runs horizontally inside the automobile 10 towards the front of the automobile 10 and terminates adjacent to the top of a rear seat back 23 (see FIG. 1). The lower end of the outer panel 21 is bolted to the inner panel 20 by bolts 24, only one of which is shown in FIG. 2. The lower side of the inner panel 20 is bent and further extends horizontally toward the rear of the automobile 10 under the boot lid 15 to form a drip channel 25. The rear end of the inner panel 20 is bent upward and is fitted into a length of weatherstrip 26, which is abutted against the boot lid 15. The upper end of the inner panel 20 is bent inward to construct a laterally extending step 29. The lower end of the rear window 14 is fixed to the step 29 of the inner panel 20 from the outside by means of adhesive 27. A length of rubber seal 28 is provided between the rear window 14 and the inner panel 20 in such a manner as to cover the adhesive 27 in front of the rear window 14. The upper end of the outer panel 21 is curled inward to abut against the rear window 14 and cover the outer surface of the adhesive 27 and the joint between the rear window 14 and the inner panel 20.

The inner panel 20 is provided with a pair of rectangular apertures 30 and 31 at the opposite ends of the sloping portion thereof or the opposite sides of the same with respect to the automobile 10, and recessed steps 30A and 31A around the apertures 30 and 31 respectively. The outer panel 21 is also provided with a pair of similar apertures 32 aligned with the foregoing apertures 30 and 31 in the assembled state. The auxiliary stop indicator units 17 and 18 are inserted into the apertures 30 and 31 respectively and then fixed to the inner panel 20 before the outer panel 21 is bolted to the inner panel 20 in such a manner that the auxiliary units 17 and 18 extend through the apertures 32.

Each of the auxiliary stop indicator units 17 and 18 consists of a box-like casing 33, a bulb 34, and a bulb holder 35 receiving the bulb 35. Each holder 35 is attached to the base of its respective casing 33 so that each bulb 34 will be positioned inside its respective casing 33. Leads 36 are connected to each holder 35 to supply electric power to the respective bulbs 34. The back wall of each casing 33 is made of a transparent red-colored lens 37 to emit concentrated red light backward when the bulb 34 is energized to turn on.

A pair of box-like grille assemblies 38 and 39 are combined with the auxiliary stop indicator units 17 and 18 respectively or the casings 33, on the inner side surfaces of the units 17 and 18 respectively. The grille assemblies 38 and 39 have the same height as the auxiliary units 17 and 18 so as to be aligned with the units 17 and 18. Each of the auxiliary units 17 and 18 together with the grille assemblies 38 and 39 respectively has a loop-like common flange 40 on its periphery corresponding to the steps 30A and 31A around the apertures 30 and 31 respectively. The auxiliary units 17 and 18 together with the grille assemblies 38 and 39 respectively are inserted into the apertures 30 and 31 respectively and then fixed to the inner panel 20 by means of screws 41 and 42 through the flanges 40. A loop-like rubber seal 43 is provided between each flange 40 and the step 30A or 31A of the inner panel 20. To cover the inner panel 20, the outer panel 21 is attached thereto in such a manner that the auxiliary units 17 and 18 and grille assemblies 38 and 39 respectively run through the common apertures 32. Each outer face of the grille assemblies 38 and 39 opens to the outside of the automobile 10, while each inner end thereof is attached by means of a band 44 to the end of a duct 45 to communicate with the same. The other end of each duct 45 opens to the inside of the automobile 10 to ventilate the same through the grille assembly 38 or 39. Each duct 45 is equipped with a device (not shown) to prevent water entering the inside of the automobile 10 along the duct 45.

Figure 5:
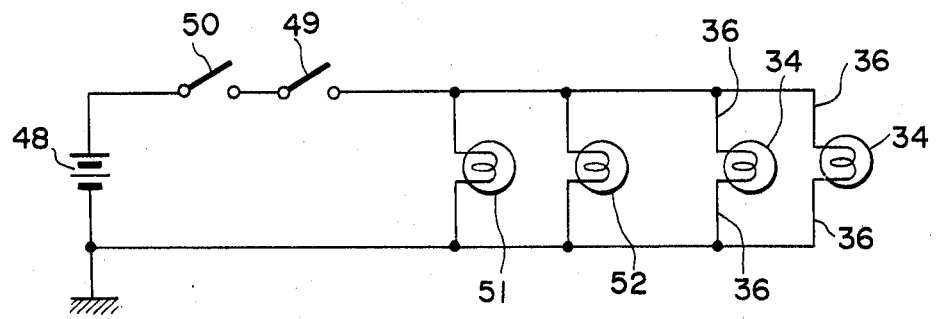
FIG. 5 is a circuit diagram of the stop indicator arrangement of FIG. 1.

As shown in FIG. 5, one terminal of each bulb 34 is connected to the positive terminal of an automobile's storage battery 48 serving as an electric power source through the lead 36, a brake switch 49, and an automobile engine ignition switch 50. The other terminal of each bulb 34 is connected to the negative terminal of the battery 48 through the lead 36. The negative terminal of the battery 48 is grounded. The stop lamp bulbs 51 and 52 in the indicator units 11 and 12 (see FIG. 1) are connected in parallel with the bulbs 34. The brake switch 49 is operated by the brake pedal of the automobile in such a way as to be closed when the brake pedal is depressed. When the brake pedal is depressed, the brake switch 49 is closed and thus the bulbs 34 along with the bulbs 51 and 52 are energized to emit red light backwards in order to indicate the application of the brake to drivers of following automobiles, provided that the ignition switch 50 is also closed.

Figure 6:
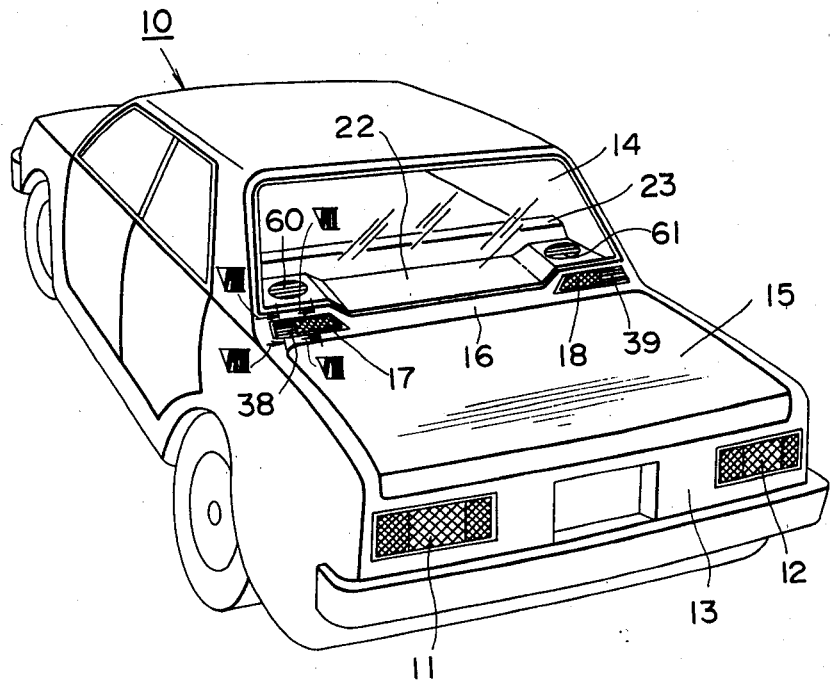
FIG. 6 is a diagrammatical perspective view of an automobile equipped with a stop indicator arrangement according to a second embodiment of the present invention.

Reference is made to FIG. 6 illustrating a second embodiment of the present invention, wherein corresponding or similar elements are designated by the same numerals as those in FIGS. 1 to 5. An automobile 10 has a pair of indicator units 11 and 12 at the opposite ends of an automobile rear panel 13, a rear window 14, and a boot lid 15, in a similar manner to the foregoing first embodiment. A laterally extending elongated panel 16 is provided between the lower end of the rear window 14 and the front end of the boot lid 15. A pair of auxiliary stop indicator units 17 and 18 are mounted at the opposite ends of the panel 16 so as to face backward. Thus the auxiliary stop indicator units 17 and 18 are in positions higher than those of the indicator units 11 and 12. The usual indicator units 11 and 12, and the auxiliary stop indicator units 17 and 18 are all connected to an automobile storage battery through a brake switch (not shown) in a similar manner to the foregoing first embodiment, so that when the brake (not shown) of the automobile 10 is applied, the units 11, 12, 17 and 18 are all energized to emit red light backward.

A pair of loudspeakers 60 and 61 are mounted at the opposite ends of a rear parcel shelf panel 22, or the opposite sides of the same with respect to the automobile 10, behind a seat back 23. The loudspeakers 60 and 61 are used for an audio system, a radio receiver, or the like, and are accommodated in the same frames or housings as the auxiliary stop indicator units 17 and 18 respectively, as described hereinafter.

Figure 7:
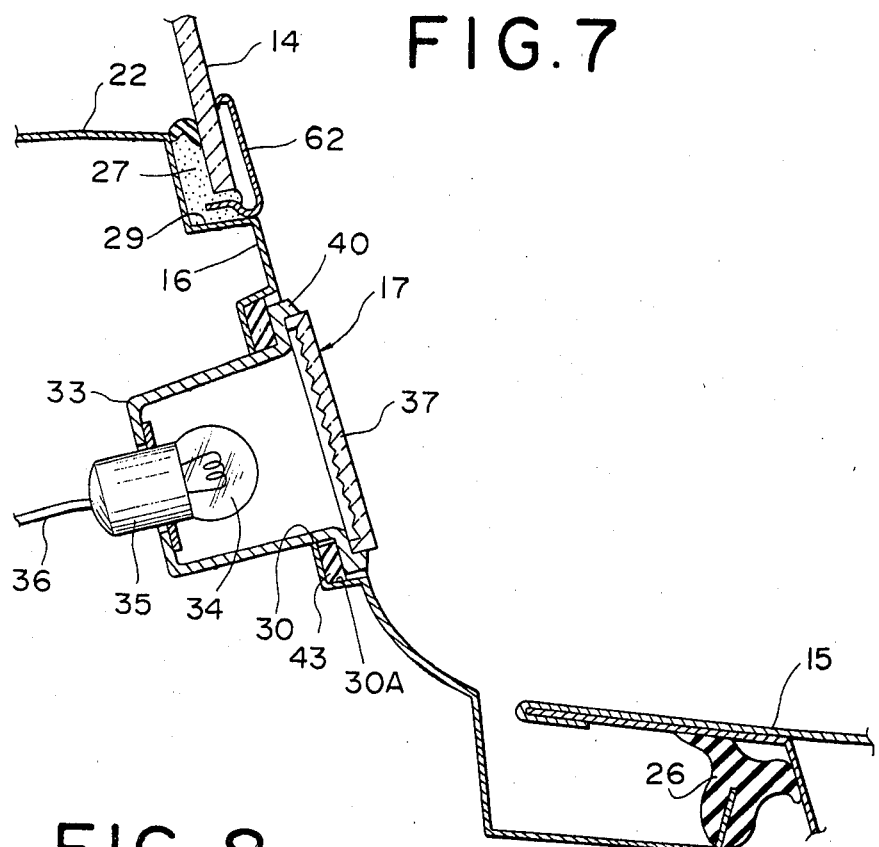
FIG. 7 is a section taken through the line VII—VII of FIG. 6.
Figure 8:
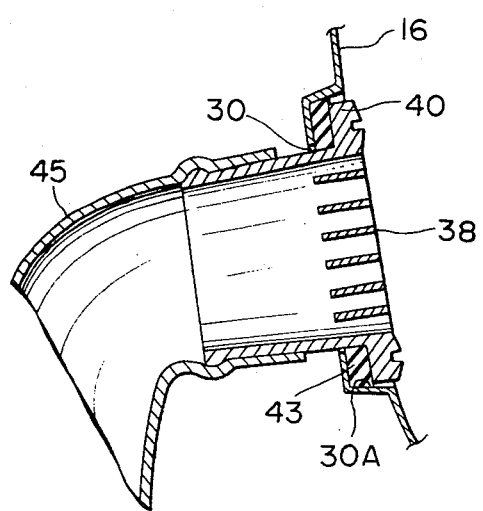
FIG. 8 is a section taken through the line VIII—VIII of FIG. 6.
Figure 9:
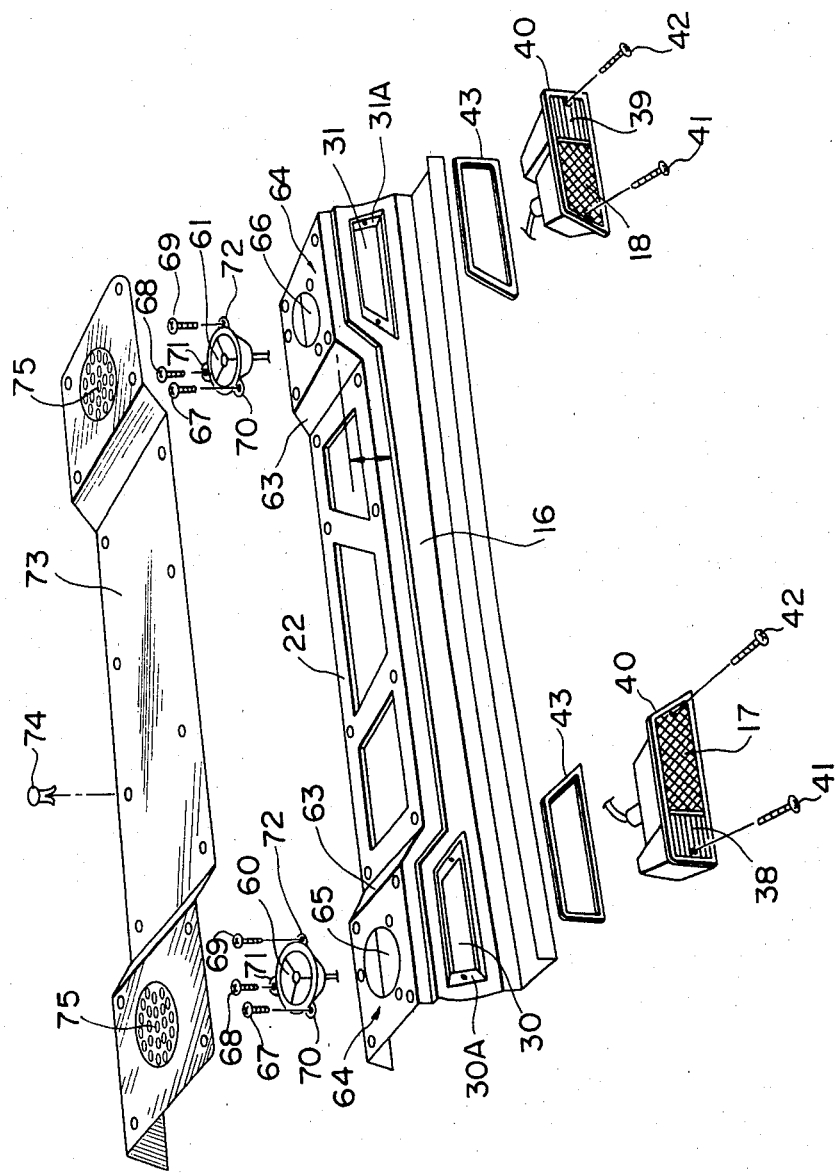
FIG. 9 is an exploded view of the stop indicator arrangement of FIG. 6.

As shown in FIGS. 7 to 9, the panel 16 is formed integrally with the parcel shelf panel 22 and is furnished at its lower end with a drip channel 25 under the boot lid 15 and at its upper end with a laterally extending inward step 29, in a similar manner to the foregoing first embodiment. A length of weatherstrip 26 is provided between the rear end of the panel 16 and the front end of the boot lid 15. The lower end of the rear window 14 is fixed to the outside of the upper end of the panel 16 by means of adhesive 27. A length of rubber seal 28 is provided between the rear window 14 and the panel 16 in such a manner as to cover the adhesive 27 inside the rear window 14. A laterally extending elongated outer panel 62 is fixed by the adhesive 27 to the panel 16 in such a manner as to cover the outward facing surface of the adhesive 27 and the joint between the rear window 14 and the panel 16.

The panel 16 is deeper or wider upward at its ends, in which a pair of apertures 30 and 31 are formed to accommodate the auxiliary stop indicator units 17 and 18 respectively. The panel 16 is furnished with recessed steps 30A and 31A around the apertures 30 and 31 respectively. Each of the auxiliary units 17 and 18 consists of a box-like casing 33, a bulb 34, and a bulb holder 35 receiving the bulb 34. Each holder 35 is attached to the front wall of the respective casing 33 so that each bulb 34 will be positioned inside the respective casing 33. Leads 36 are connected to each holder 35 to supply electric power to the respective bulbs 34. The back wall of each casing 33 is made of a transparent red-colored lens 37 to emit concentrated red light backward when the bulb 34 is energized to turn on.

A pair of box-like grille assemblies 38 and 39 are combined with the auxiliary stop indicator units 17 and 18 respectively on the outer side surfaces of the units 17 and 18. Each of the auxiliary units 17 and 18 together with grille assemblies 38 and 39 has a loop-like common flange 40 around the periphery of its back wall. The auxiliary units 17 and 18 together with the grille assemblies 38 and 39 respectively are inserted into the apertures 30 and 31 respectively and then fixed to the panel 16 by means of screws 41 and 42 with loop-like rubber seals 43 interposed between the flanges 40 and the step 30A or 31A of the panel 16 respectively. Each outer face of the grille assemblies 38 and 39 opens to the outside of the automobile 10, while each inner end thereof is fitted into the end of a duct 45 to communicate with the same. The other end of each duct 45 opens to the interior of the automobile 10 to ventilate the same via the grille assembly 38 or 39.

The parcel shelf panel 22 is raised at each end at 63 to construct a pair of frames or housings 64 at its opposite ends in conjunction with the deeper portions of the panel 16 around the apertures 30 and 31. The upper walls of the frames 64 have circular apertures 65 and 66, into which the loudspeakers 60 and 61 respectively are inserted from above and each fixed by means of screws 67, 68 and 69 to the parcel shelf panel 22 through angularly spaced tabs 70, 71 and 72 respectively on the peripheries of each loudspeaker 60 or 61. Thus the frames 64 accommodate the auxiliary stop indicator units 17 and 18, together with the grille assemblies 38 and 39, and the loudspeakers 60 and 61, respectively. A finishing panel 73 shaped corresponding to the parcel shelf panel 22 is attached so as to cover the panel 22 by means of fasteners 74, only one of which is shown in FIG. 9. The finishing panel 73 has a plurality of small holes 75 within circles matching the positions of the loudspeakers 60 and 61 in the assembled state, in order to allow the sound from the loudspeakers 60 and 61 to enter the interior of the automobile 10.

It should be understood that the stop lamps, namely the bulbs 51 and 52 in the indicator units 11 and 12 respectively may be eliminated in the present invention. It should be also understood that further modifications and variations may be made in the present invention without departing from the spirit and scope of the present invention as set forth in the appended claims.

What is claimed is:

1. A stop indicator arrangement for an automotive vehicle having a rear window, a boot lid lower than the rear window in the closed position, and a brake system, the arrangement comprising:
    (a) a laterally extending panel provided between the lower end of the rear window and the front end of the boot lid, the panel having an aperture therein and sloping downwardly in the direction from the front to the rear with respect to the vehicle;
    (b) means for emitting light when energized;
    (c) means for energizing the light-emitting means when the brake system is applied;
    (d) a casing housing the light-emitting means and extending through said panel aperture;
    (e) means for attaching the light-emitting means to the casing;
    (f) a ventilating grille unit being contiguously combined with the casing and extending through the aperture of the panel;
    (g) a flange formed around the combination of the casing and the grille unit; and
    (h) means for attaching the flange to the panel to mount the combination of the casing and the grille unit.

2. A stop indicator arrangement as recited in claim 1, further comprising a sealing member provided between the panel and the flange.

3. A stop indicator arrangement as recited in claim 1, wherein the panel has a step around the aperture, the step corresponding to the flange and engaging the flange.

4. A stop indicator arrangement as recited in claim 1, wherein the panel slopes at the same angle as that of the rear window.

5. A stop indicator arrangement as recited in claim 1, further comprising an outer member extending essentially parallel to the panel and being attached to the panel, the outer-member having an opening aligned with the aperture of the panel, the combination of the casing and the grille unit also extending through the opening of the outer member.

6. A stop indicator arrangement for an automotive vehicle having a rear window, a boot lid lower than the rear window in the closed position, and a brake system, the arrangement comprising:
    (a) a laterally extending panel provided between the lower end of the rear window and the front end of the boot lid, the laterally extending panel having an aperture therein and sloping downwardly in the direction from the front to the rear with respect to the vehicle;
    (b) means for emitting light when energized;
    (c) means for energizing the light-emitting means when the brake system is applied;
    (d) a casing housing the light-emitting means and extending through the aperture of the laterally extending panel;
    (e) means for attaching the light-emitting means to the casing;
    (f) a ventilating grille unit being contiguously combined with the casing and extending through the aperture of the laterally extending panel;
    (g) a flange formed around the combination of the casing and the grille unit;
    (h) means for attaching the flange to the laterally extending panel to mount the combination of the casing and the grille unit;
    (i) a horizontal parcel shelf panel extending from the upper edge of the laterally extending panel;
    (j) a frame formed by the parcel shelf panel and the laterally extending panel around the aperture, the frame accomodating the combination of the casing and the grille unit;
    (k) a loudspeaker accommodated in the frame; and
    (l) means for attaching the loudspeaker to the frame.

7. A stop indicator arrangement as recited in claim 6, further comprising a sealing member provided between the laterally extending panel and the flange.

8. A stop indicator arrangement as recited in claim 6, wherein the laterally extending panel has a step around the aperture, the step corresponding to the flange and engaging the flange.

9. A stop indicator arrangement as recited in claim 6, wherein the laterally extending panel slopes at the same angle as that of the rear window.

10. A stop indicator arrangement as recited in claim 6, wherein the laterally extending panel has a width-increased portion around the aperture, and wherein the parcel shelf panel has a raised portion extending from the width-increased portion of the laterally extending panel, the raised portion of the parcel shelf panel and the width-increased portion of the laterally extending panel forming the frame, the loudspeaker being attached to the raised portion of the parcel shelf panel.

* * * * *